Oct. 19, 1943.   W. FRIEDRICHS ET AL   2,331,969
DEVICE FOR PRODUCING TUBULAR BODIES
Filed Nov. 7, 1940
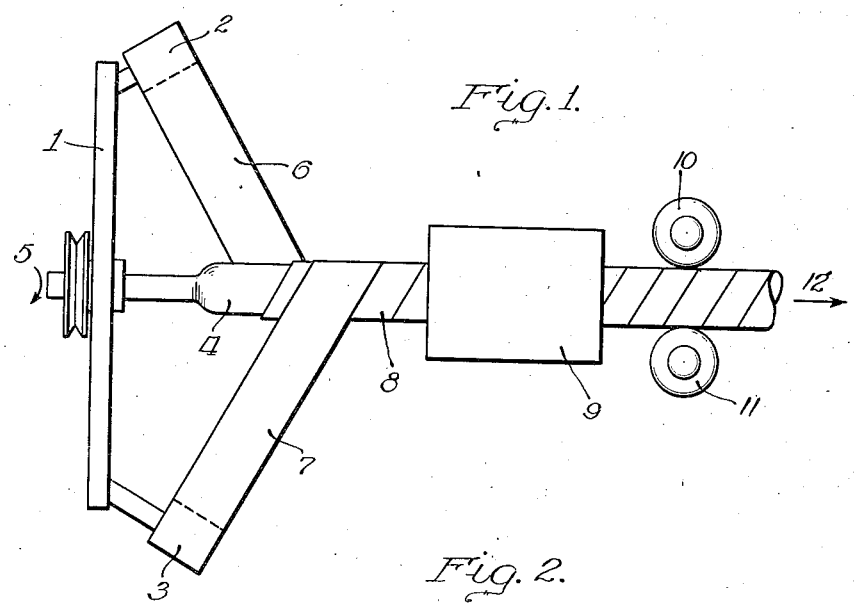
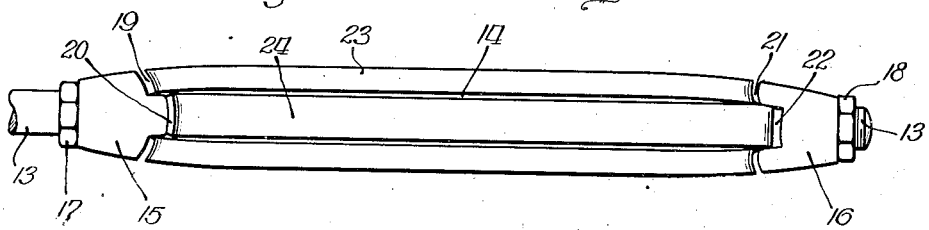
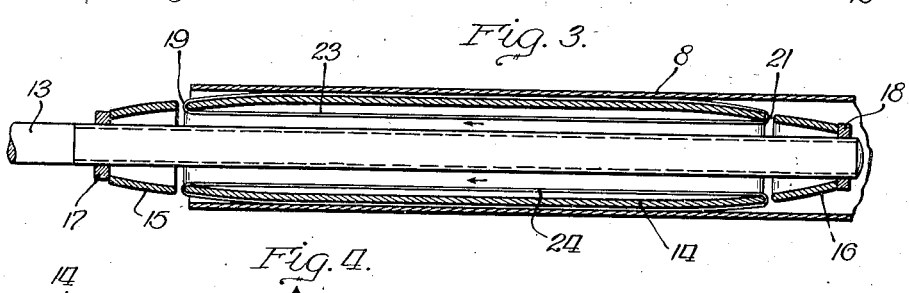
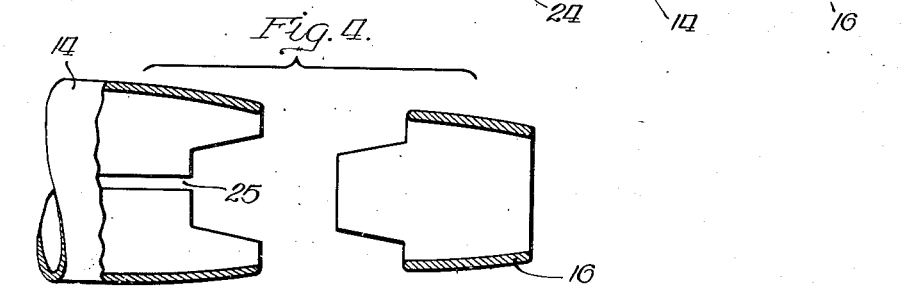
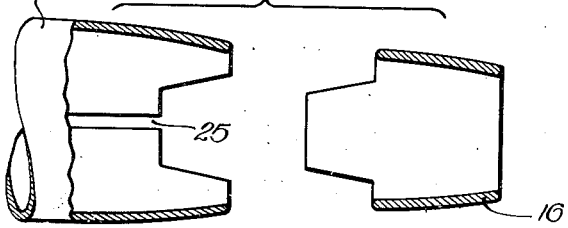
INVENTORS:
Werner Friedrichs
Heinrich Geffcken
BY Richardson and Auer
Attys.

Patented Oct. 19, 1943

2,331,969

UNITED STATES PATENT OFFICE 2,331,969

DEVICE FOR PRODUCING TUBULAR BODIES

Werner Friedrichs and Heinrich Geffcken, Berlin-Charlottenburg, Germany; vested in the Alien Property Custodian Application November 7, 1940, Serial No. 364,644 In Germany November 16, 1939

6 Claims. (Cl. 93—80)

This invention relates to devices for producing tubular bodies, and is particularly concerned with a new mandrel for use with machines for making tubing, for example, of paper, cellulose products, artificial resin substances, or the like. The so-called spaghetti tubing used for insulating purposes may be mentioned as an example of the type of tubing that can be manufactured with a device made according to the invention.

Such tubing is usually made by winding bands or ribbon-like bodies, which may or may not be provided with adhesive, over a mandrel and drawing the resulting structure through a dryer so as to solidify the adhesive if the bands are provided with it, or through a suitable device wherein the adhesive is put on the tubing and subsequently dried and solidified. The finished tubing is removed from the mandrel in a continuous process and may be cut in suitable lengths or wound on storage drums.

The usual process outlined above in its general features causes difficulties in the continuous removal of tubing from the mandrel, because this requires continuous, progressive and unimpeded movement of the tubing with respect to the mandrel. This movement is frequently interrupted because the tubing has a tendency to adhere to the mandrel, due to the fact that the adhesive acts not only on the layers of the tubing material, but causes the tubing to adhere to the mandrel. This tendency becomes more pronounced in cases requiring a smooth, tight winding of the tubing layers.

The invention avoids the above intimated drawbacks and difficulties by the provision of a mandrel which is equipped on its surface with longitudinally movable endless, belt-like members contacting the inside of the tubing wound thereon and moving with it substantially to the end of the mandrel where the belt-like members reverse the direction of their motion and roll off the inside of the tubing uniformly point by point, freeing the tubing and thus facilitating its smooth and continuous removal from the mandrel.

The various features and objects of the invention are described below in detail with reference to the accompanying drawing, wherein Fig. 1 shows a more or less schematic view of the salient parts of a machine for producing tubing;

Figs. 2 and 3 illustrate an embodiment of the new mandrel in plan view and in longitudinal section, respectively; and Fig. 4 shows details of the new mandrel.

The machine represented in Fig. 1 operates somewhat in the manner of cable winding machines. Attached to a rotatable arm 1 are rollers 2 and 3 carrying the winding material, for example, the Cellophane or paper ribbons 6 and 7. Numeral 4 indicates the mandrel on which the ribbons 6, 7 are wound to form the tubing 8. The winding is accomplished by rotating the arm 1 in the direction of the arrow 5. The tubing 8 is drawn through the device 9 where it may be subjected to heating so as to solidify the adhesive or to glue the windings together to form the finished tubing. The rollers 10 and 11 act upon the tubing to remove it in a continuous motion from the mandrel in the direction of the arrow 12.

If such a machine is equipped with the usual mandrel, the previously intimated difficulties and often insurmountable operating troubles will appear, due to the tendency of the tubing to adhere to the mandrel. A continuous removal of the tubing is then impeded, and the ribbon material 6, 7 is quickly entangled and piles up on the mandrel, stopping production.

The new mandrel shown in Figs. 2-4, inclusive, eliminates these troubles. It comprises the shaft 13 carrying the slotted tubular member 14 and the two caps 15, 16, one at either end of the shaft. These parts are held together on the shaft 13 by means of the nuts 17 and 18. Transverse slots 19, 20 and 21, 22, respectively, are formed at either end of the structure between the end caps 15, 16 and the tube 14. These slots are staggered longitudinally of the mandrel and are formed by utilizing the tongue and groove construction shown in Fig. 4, the tongues being slightly wider than the corresponding grooves so that they cannot fully enter therein. Endless bands such as 23, 24 are threaded through these transverse slots, forming track grooves therefor, and cover the tubular member 14 longitudinally, each band looping inwardly of the tubular member, as shown. Several such endless bands may be provided and radially distributed on the longitudinally slotted tube 14 so as to cover its surface as fully as is desirable or necessary. Depending on the size of the tubing to be produced and on the type of material from which it is made, six to eight such endless bands may be carried on the mandrel. These transport bands or ribbons may be made of any desired and suitable material, for example, of metal foil or of textile fabric. The tubular member 14 is slightly tapered at its ends toward the junction points with the end caps 15, 16, and the edges of the transverse track slots 19–22, inclusive, formed at these points are preferably rounded and polished so as to facilitate the transport motion of the endless bands. The tapered structure furnishes an additional advantage inasmuch as the endless bands are drawn inwardly prior to reaching the turning points, thus assisting in separating the tubing from any adhesion with the bands.

The transport bands move with the tubing 8 from left to right and thus cause the unimpeded transport and removal thereof. At the points where the endless bands reverse their direction, they roll off the inside of the tubing point by point uniformly and smoothly, breaking any adhesion that might have been established and leaving the tubing entirely free for smooth, continuous removal without any jerking whatsoever.

The bands 23, 24 may have to be renewed from time to time. The mandrel is for this purpose easily dismantled merely by removing the nut 18, thus freeing the end cap 16 and also the tube 14 for removal from the shaft 13. The contacting surfaces forming the transverse track slots 19-22 are thus exposed and made accessible. The tube 14 being longitudinally slotted, it will now be possible to remove the individual endless bands such as 23, 24 through the slot 25 and to insert new bands to take their place. The transverse slots are closed and the device is again in operating order upon putting in place the end caps 15, 16 and tightening the nut 18.

The new device is not limited in its use, either to winding machines of the type specifically shown in Fig. 1, or to any particular winding materials such as previously mentioned, or to any specific kind of tubing to be produced. It can be used advantageously in connection with practically any tubing or pipe producing process or machine where the resulting product has a tendency to adhere to the mandrel for any reason. It is therefore understood that specific examples given herein are intended for illustrative purposes only and not for limiting the invention.

What is believed to be new and desired to have protected by Letters Patent of the United States is defined in the appended claims.

We claim as our invention:

1. A device for producing tubing, comprising a tubular mandrel for supporting the tubing during formation thereof, series of longitudinally staggered circumferentially arranged slots at the opposite ends of said mandrel, the slots at the opposite ends of the mandrel being longitudinally aligned in pairs, and flexible belts stretched between the slots of each pair and lying partly inside and partly outside of said mandrel, the outside portions of said belts providing a movable surface for the mandrel permitting the formed tubing to be readily withdrawn from the mandrel.

2. A mandrel for use in producing tubing, comprising a shaft, a tubular member on said shaft having its axis coincident with the axis of said shaft, means on said shaft including two tapered cap members engaging the opposite ends of said tubular member and supporting said tubular member on said shaft, portions of said cap members being spaced away from the ends of said tubular member to form a plurality of slots, and an endless belt made of flexible material extending through each slot at one end of said tubular member and through the corresponding slot at the other end of said tubular member.

3. A mandrel for use in the manufacture of tubing, comprising a shaft, two clamping members spaced apart along said shaft, a tubular member arranged on said shaft between said clamping members, means for moving one of said clamping members axially of the shaft to effect clamping of the tubular member between said clamping members, a plurality of slots provided at the junction of each clamping member with said tubular member, and a plurality of belts of flexible material extending between the slots at one end of said tubular member and slots at the other end of said tubular member.

4. A mandrel as claimed in claim 3, wherein the tubular member is formed at each end with tapered tongues and grooves, and the clamping members are formed with similar tongues and grooves adapted to cooperate therewith, and wherein the slots are formed at the bottoms of the grooves due to the fact that the tongues are made slightly larger than the corresponding grooves and are unable to fully enter said grooves when the tubular member is clamped.

5. A mandrel as claimed in claim 2, wherein the portions of the tubular member which form sides of the slots are rounded to provide bearing surfaces over which the belts slip easily.

6. A mandrel for use in the manufacture of tubing, comprising a shaft, a tubular member on said shaft, said tubular member having an internal diameter which is greater than the diameter of the shaft, means on the shaft for supporting said tubular member solely at the ends thereof with its axis coincident with the axis of the shaft, whereby said tubular member is spaced away from the shaft throughout, a similar number of rounded bearing surfaces formed integrally with said tubular member at each end thereof, and a lengthwise movable surface for said mandrel comprising endless flexible belts extending between related bearing surfaces at the opposite ends of said tubular member.

WERNER FRIEDRICHS.
HEINRICH GEFFCKEN.